June 7, 1932.  J. PICCO  1,861,977
AEROPLANE
Filed Nov. 2, 1929    2 Sheets-Sheet 1

Inventor:
John Picco.
By F. V. Winter.
Attorney

June 7, 1932. J. PICCO 1,861,977
AEROPLANE
Filed Nov. 2, 1929 2 Sheets-Sheet 2
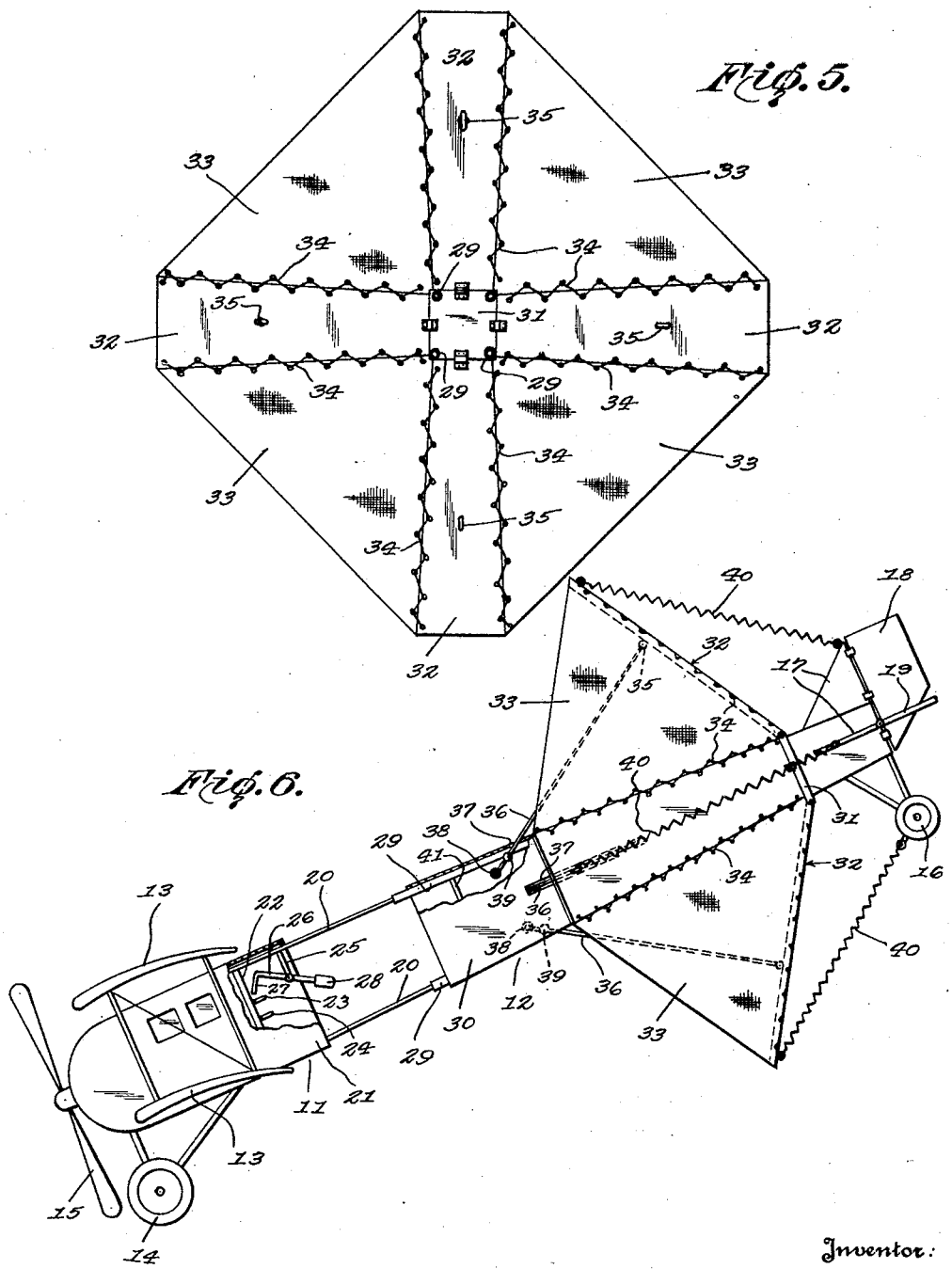

Patented June 7, 1932

1,861,977

UNITED STATES PATENT OFFICE

JOHN PICCO, OF NEW YORK, N. Y.

AEROPLANE

Application filed November 2, 1929. Serial No. 404,343.

This invention relates to aeroplanes, and the improvements are directed to a novel form of apparatus wherein the passengers aloft in an aeroplane may be safely landed in the event of failure of the engine or other disablement such as wing crumpling, or the like.

By way of a brief introduction it is pointed out that, obviously, in heavier than air flying machines, or like craft, the continued maintenance of the same in the air depends measurably upon the uninterrupted operation of the motor or engine propelling said machine. In the event of failure of said engine the machine must manifestly respond to the law of gravity, and the resultant crash on the earth means total destruction of the machine and quite frequently fatal injuries to the passengers and pilot.

Awaiting the development of the perfect aeroplane motor, my predecessors in this art have proposed the attachment of lighter-than-air apparatus to an ordinary plane and some have adopted the use of a parachute, normally inactive, but in a position to be opened during the descent of the plane due to motor failure.

However, these ideas have not been well received by the experts in aeronautics, since the attachment of a lighter-than-air apparatus, such as a balloon, or the like, has materially encumbered the operation of a plane, and the parachute idea, whether automatically or hand-operated, appears to have been discarded, as it seems to have been impossible to conveniently carry a parachute of sufficient sustaining power for the combined weight of the passengers and the plane itself, when the latter is under the influence of the law of gravity.

Recognizing the above shortcomings, I propose to provide an aeroplane with suitable parachute mechanism, and in order that said parachute will sustain its load, I provide means whereby the heavier portions of said aeroplane, such as the motor, the forward fuselage, including the wings, may be released from the rear fuselage, thus materially lightening the burden thrust upon the parachute and positively assuring a safe landing of the passengers and pilot.

Accordingly, it is the primary object of the present invention to provide an aeroplane having separable sections.

Another object of the invention is to provide means whereby the lighter of said separable sections may be subjected to the law of gravity in a manner to permit safe and gradual landing of the same on the earth.

Still another object is to provide means whereby the said sections may be separated.

A still further object of the invention is to provide a novel form of frame-members, included in the fuselage, which are telescopically engaged and which causes a slight retardation in the separation of the sections in order that the lighter section may assume a substantially vertical position as the parachute is extended to open position.

Still a further object is to provide means for simultaneously releasing the sections and freeing the means normally holding the parachute in closed position.

A still further object of the invention resides in the provision of means for bracing certain portions of the parachute when the same is in open position.

With these objects in view, together with others which will appear as the description proceeds, the invention resides in the novel formation, combination and arrangement of parts, all as will be described more fully hereinafter, illustrated in the drawings, and particularly pointed out in the claims.

In said drawings:

Fig. 5 is a view of the parachute arrangement in distended position as viewed when looking from the forward section to the rear section.

Fig. 6 is an elevation, with parts broken away, and showing the sections during the releasing thereof, and the partial opening of the parachute arrangement, said view depicting that the sections are separated in a retarded manner to permit the vertical positioning of the rear section.

Figure 1:
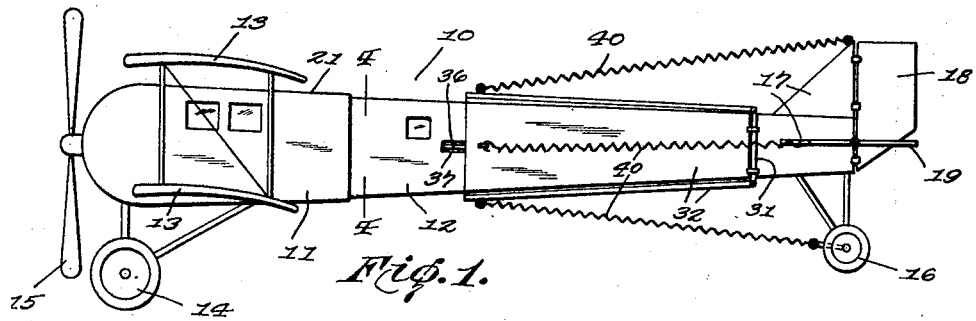
Figure 1 is an elevation of an aeroplane constructed in accordance with my invention, said aeroplane being in normal flying condition with the sections in locked position and the parachute snugly engaging the sides of the rear fuselage, or rear section.

Referring now more in detail to the accompanying drawings, wherein like characters of reference denote similar parts throughout the several views, let 10 indicate an aeroplane constructed in accordance with my invention, the same comprising the forward section 11 and the rear section 12, capable of separation in mid-air.

Said forward section 11 includes the usual wings 13, landing-gear 14 and propeller 15, the latter being operated by a motor under control of the pilot normally occupying said section.

Said rear section 12 includes the tail wheel 16, fixed fins 17, the rudder 18, and the elevators 19, all of which being common to aeroplane construction.

Figure 2:
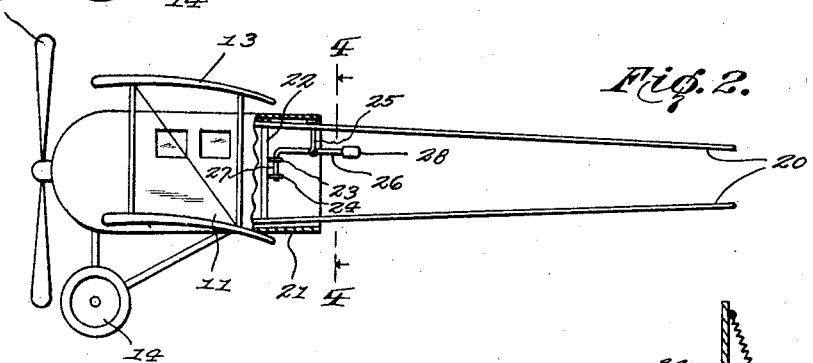
Fig. 2 is an elevation of the forward section of the aeroplane shown in Fig. 1, parts being broken away to expose certain releasing means.
Figure 4:
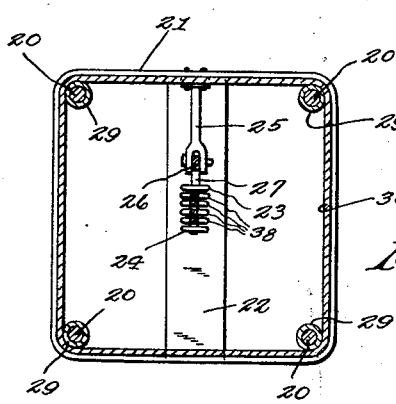
Fig. 4 is a transverse sectional view, somewhat enlarged and taken on the line 4—4 of Fig. 1, to exhibit the telescopic arrangement of certain frame members and to expose the operation of said releasing means as viewed in the direction of the arrows at line 4—4 of Fig. 2.

Upon inspection of Figs. 2 and 4, it will be noted that said forward section 11 includes a frame comprising rods 20, which extend rearwardly of said section, said rods being positioned at the corners of the closure 21 and extending rearwardly thereof in spaced relation. It will also be observed in said figures that I provide a vertical stanchion 22, suitably secured to the top and bottom of said closure 21, its rear medial portion carrying a pair of spaced eyes 23 and 24. Depending from the top of said closure is a hanger 25, pivotally supporting certain releasing means, in the form of a lever 26, the forward end thereof having a lateral portion 27, normally insertible in said eyes 23 and 24. Upon operating the handle 28 downwardly, it is obvious that said lateral portion 27 will be lifted through the eyes 23 and 24, as shown in Fig. 6. As will presently appear, said eyes and lever cooperate with certain other parts to hold the sections in releasable engagement and at the same time maintain the parachute in the closed position shown in Fig. 1.

Figure 3:
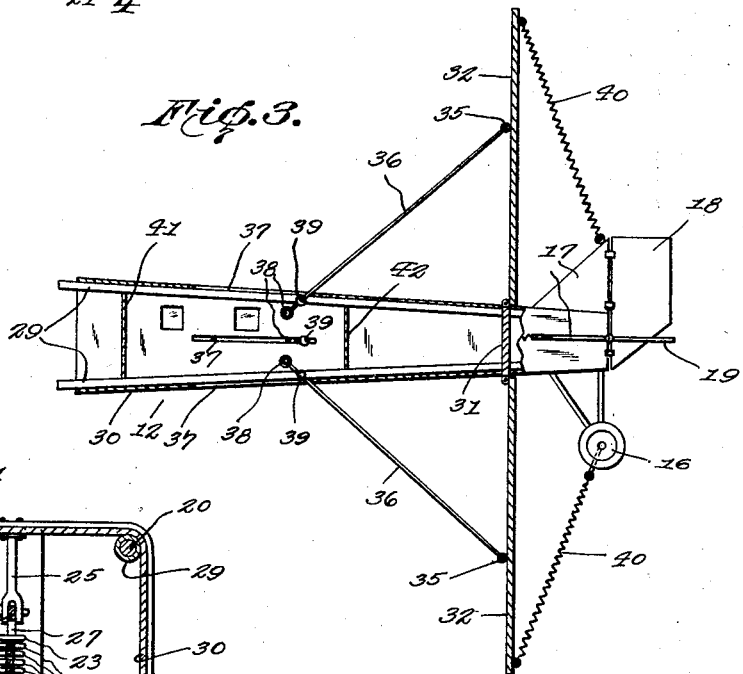
Fig. 3 is a sectional view, partly in elevation, of the rear section of the aeroplane, the parachute arrangement being opened, or distended, and braced as shown.

Said rear section 12 is also provided with frame members, which aline with said frame members 20 of the forward section, said frame members 29 being tubular, as shown in Fig. 4, and adapted to support the closure 30, substantially encasing the entire rear section. Said tubular frame members 29 also support a plate 31, the marginal portions of the latter hingedly carrying the non-flexible members 32, as shown in Fig. 5. Thus, each of the four sides of said plate 31 hingedly carries a member 32. The outline of each of said members 32 conforms to the adjacent configuration of the closure 30 and when said members are folded as shown in Fig. 1, they snugly abut the contiguous surface of said closure in order that wind resistance may be reduced to a minimum. As is now apparent, said members 32 are included in the parachute arrangement, but in order that a true parachute effect may be obtained, I propose to provide the pieces of flexible material 33 which fill the spaces between said members, their attachment to said members being effected by means of lacings 34, or the like. Since said flexible pieces 33 are readily foldable they lie between the closure 30 and the members 32 when the parachute assumes the position shown in Fig. 1. Obviously, it becomes necessary to provide means for holding the members 32 in the closed position aforesaid, and to this end each of said members is provided with an eye 35, carrying one end of a flexible element 36, each extending through slot 37, arranged in the top, bottom and sides of said closure 30, as shown in Fig. 3. The other end of each of said elements 36 is provided with a ring 38, each ring being arranged in superimposed position between the spaced rings 23 and 24, and when the lateral portion 27 of said lever 26 is passed through the series of eyes, said members 32 and the attached flexible pieces 33, snugly abut said closure 30 and are there securely fastened during the normal flight of the aeroplane.

It has been stated that the securing of the lateral portion 27 of said lever 26 within the rings 38, when said rings are interposed between said eyes 23 and 24, causes the parachute arrangement, formed by the members 32 and pieces 33, to snugly embrace the adjacent portion of said closure 30 and to lie thereagainst until the lever is manipulated. Manifestly, when the tubular frame members 29 are inserted over the rods 20 forming the frame of said forward section 11, the forward edge of said closure 30 soon abuts the rear end of said closure 21, and as that portion of the latter is slightly elevated, as shown in Fig. 2, said forward end of said closure 30 fits therebeneath, as shown in Fig. 1. When this has been accomplished the rings 38 are secured between the eyes 23 and 24, as aforesaid. Thus, the single operation of said lever 26, secures the sections 11 and 12 in the position shown in Fig. 1, and also secures the parachute arrangement in the position therein shown. During the normal flight of the machine, the sections are locked together and the parachute arrangement is secured in the position indicated.

The rear section 12 has been arranged so that the passengers normally occupy this portion of the plane, while the pilot may occupy the forward section, but within easy reach of the lever 26. In the event the engine fails and it becomes apparent that a fall is imminent, the pilot grasps the handle 26 and quickly disengages the lateral portion 27 from the eyes 23 and 24, thus freeing the rings 38 at the end of each of said flexible elements 36. This one movement starts the separation of the sections and also the parachute arrangement. Immediately the forward section, being the heavier, starts to drop and the tubular frame members 29 begin to slide along the rods 20. At the same time elements 36 run out through the slots 37 until an abutment 39 on each element 36 reaches the lower end of its respective slot 37, whereupon the outward swing of said members 32 is limited and braced against further swinging.

In Fig. 6 of the drawings a partial separation of the sections and a partial opening of the parachute arrangement is shown. The parts here shown are in the positions just after the operation of the lever 26 as aforesaid. The heavier front or forward section is rapidly descending and thus tending to right the rear section. That is, bring the same up to a vertical position. At the same time the opening of the parachute arrangement is tending to retard the downward movement of the rear section and about the time the abutments 39 have reached the ends of the slots 37 the rear section is in a substantially vertical position and the parachute is opened to the position shown in Fig. 3.

While the releasing of the rings 38 tends to free the parachute from the outside of the closure 30, I prefer to provide springs 40 which extend from the ends of each of the members 32 to a convenient point or convenient structure carried by the rear section. For instance, the top spring shown in Fig. 3 may be secured to the top fin 17, as shown, while the bottom spring shown in this figure may be suitably secured to the axle of the wheel 16. The side springs may be secured to the side fins 17 shown in Figs. 3 and 6. In view of this spring arrangement the members 32 are initially lifted from the closure 30, and the rush of wind under the members 32 soon effects the opening of the parachute, as is quite obvious.

The rods 20 extending from the forward section 11 are naturally resilient and may be considered as exerting a spring action within the tubular members 29. They are free to slide out of said tubular members 29 and at the same time to frictionally engage said members so that it might be said a slight braking action occurs in order that the heavier forward section may descend a fair distance and right the rear section to a substantially vertical position before the sections are actually separated.

After operating the lever 26 the pilot has ample time to enter the rear section and in view of the partitions 41 and 42, the passengers and pilot have ample resting places during the descent of the rear section.

Thus, with one operation of a lever the sections are separated and the parachute arrangement brought to operative position. Further, a reversal of the above operation, with the parts in position as aforesaid, locks the sections together and brings the parachute arrangement in close engagement with the rear section.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. An aeroplane comprising a forward section having rearwardly directed rod-like flexible frame members, a pivoted lever borne by said forward section, a pair of spaced eyes positioned within said section, a rear section having tubular frame members adapted to telescopically engage said rod-like frame members, a parachute arrangement including non-flexible members each being hingedly carried by said rear section, flexible elements leading from said non-flexible members and extending into said rear section, means carried by said elements and adapted to be positioned between said spaced eyes and locked thereto by said lever thereby locking the sections together and maintaining said parachute in closed position about said rear section, said lever being susceptible of operation to free said elements and to permit separation of said sections simultaneously with the opening of the parachute arrangement.

2. An aeroplane comprising telescopically engageable forward and rear sections, a lever pivotally borne by the forward section, a pair of spaced eyes positioned within said forward section, a parachute arrangement including non-flexible members each being hingedly carried by the rear section, flexible elements leading from said non-flexible members and extending into said rear section, means carried by said elements and adapted to be positioned between said spaced eyes and locked thereto by said lever thereby securing the sections together and maintaining said parachute in closed position about said rear section, said lever being susceptible of operation to free said elements and to permit separation of said sections simultaneously with the opening of the parachute arrangement.

In testimony whereof I affix my signature.

JOHN PICCO.